United States Patent
MacMahon et al.

(10) Patent No.: US 11,099,833 B2
(45) Date of Patent: Aug. 24, 2021

(54) SYSTEM AND METHOD TO MODIFY RUN-TIME BEHAVIOR OF AN APPLICATION BY MODIFICATION OF MACHINE-READABLE INSTRUCTIONS

(71) Applicant: FLEXION MOBILE PLC, London (GB)

(72) Inventors: Andreas Nils Olof MacMahon, Greater London (GB); Peter Zoltan Takacs, London (GB); Jonathan Richard Williamson, Sutton (GB)

(73) Assignee: Flexion Mobile PLC, London (GB)

( * ) Notice: Subject to any disclaimer, the term of this patent is extended or adjusted under 35 U.S.C. 154(b) by 0 days.

(21) Appl. No.: 16/188,339

(22) Filed: Nov. 13, 2018

(65) Prior Publication Data
US 2019/0079749 A1    Mar. 14, 2019

Related U.S. Application Data

(63) Continuation of application No. 15/121,234, filed as application No. PCT/IB2015/051403 on Feb. 25, 2015, now Pat. No. 10,127,035.
(Continued)

(51) Int. Cl.
*G06F 8/656* (2018.01)
*G06F 9/54* (2006.01)

(52) U.S. Cl.
CPC .............. *G06F 8/656* (2018.02); *G06F 9/541* (2013.01)

(58) Field of Classification Search
CPC .... G06F 17/5081; G06F 8/71; G06F 11/3604; G06F 21/125; G06F 21/629;
(Continued)

(56) References Cited

U.S. PATENT DOCUMENTS 7,367,025 B1    4/2008 Nikolov
7,743,367 B1    6/2010 Nikolov
(Continued)

FOREIGN PATENT DOCUMENTS

WO    2015128815 A1    9/2015

OTHER PUBLICATIONS

Miryung Kim et al.; Discovering and Representing Systematic Code Changes; IEEE; pp. 309-319; retrieved on Jun. 21, 2021 (Year: 2009).*
(Continued)

*Primary Examiner* — S. Sough
*Assistant Examiner* — Cuong V Luu
(74) *Attorney, Agent, or Firm* — Sheppard Mullin Richter & Hampton LLP

(57) ABSTRACT

A system and method of modifying an application implementation. Modification of application implementation may include modification, addition, and/or removal of machine-readable instructions. Modification of machine readable instructions prior to run-time may modify implementation of one or more features. Physical computer processor(s) may be configured by computer readable instructions to obtain machine-readable instructions. Machine-readable instructions may, cause a target computing platform to implement an application when executed. Physical computer processor (s) may obtain information regarding implementation of the application by the target computing platform and analyze the machine-readable instructions and/or the information to create one or more rules for modifying application implementation by the computing platform. Physical computer processor(s) may modify the machine-readable instructions based on the rules to add features to and/or remove features from the machine-readable instructions. The system may distribute the modified machine-readable instructions to
(Continued)

effectuate the modified machine-readable instructions to be implemented by the target computing platform.

41 Claims, 6 Drawing Sheets

Related U.S. Application Data

(60) Provisional application No. 61/944,134, filed on Feb. 25, 2014.

(58) Field of Classification Search
CPC . G06F 3/0481; G06F 8/24; G06F 8/35; G06F 8/443; G06F 8/75; G06F 17/22; G06F 16/248; G06F 8/656; G06F 9/541; G06F 8/30; G06F 9/44505; G06F 8/20; G06F 8/36; G06F 8/33; G06N 20/00
See application file for complete search history.

(56) References Cited

U.S. PATENT DOCUMENTS

| | | | |
|---|---|---|---|
| 7,836,438 | B1 | 11/2010 | Nikolov |
| 7,908,596 | B2 | 3/2011 | Mitran |
| 8,990,308 | B2 | 3/2015 | Wiig |
| 9,176,773 | B2 | 11/2015 | Fries |
| 2003/0172367 | A1 | 9/2003 | Kannenberg |
| 2007/0266378 | A1 | 11/2007 | Fukuda |
| 2009/0313004 | A1 | 12/2009 | Levi |
| 2010/0306746 | A1 | 12/2010 | Barua |
| 2011/0078656 | A1* | 3/2011 | Tsuta ............ G06F 8/41 717/106 |
| 2011/0167403 | A1 | 7/2011 | French |
| 2012/0005649 | A1 | 1/2012 | Lavin |
| 2012/0017207 | A1 | 1/2012 | Mahajan |
| 2013/0007216 | A1 | 1/2013 | Fries |
| 2013/0179867 | A1* | 7/2013 | Fitterer .......... G06F 8/71 717/130 |
| 2013/0263083 | A1 | 10/2013 | Reddy |
| 2014/0095623 | A1 | 4/2014 | Wiig |
| 2014/0245275 | A1 | 8/2014 | Elias |
| 2014/0258840 | A1* | 9/2014 | Bi ............ G06F 40/143 715/234 |
| 2017/0010886 | A1 | 1/2017 | Mac Mahon |

OTHER PUBLICATIONS

Oria Greevy et al.; Correlating Features and Code Using a Compact Two-Sided Trace Analysis Approach; IEEE; 10 pages; retrieved on Jun. 21, 2021 (Year: 2005).*

Bauman, Erick, et al., "SgxElide: Enabling Enclave Code Secrecy via Self-Modification", Proceedings of the 2018 ACM International Symposium on Code Generation and Optimization, <https://dl.acm.org/citation.cfm?id=3168833>, 2018, pp. 75-86.

Bonfante, Guillaume, et al., "CoDisasm: Medium Scale Concatic Disassembly of Self-Modifying Binaries with Overlapping Instructions", Proceedings of the 22nd ACM SIGSAC Conference on Computer and Communications Security, <https://dl.acm.org/citation.cfm?id=2813627>, 2015, pp. 745-756.

Cai, Hongxu, et al., "Certified Self-Modifying Code", Proceedings of the 28th ACM SIGPLAN Conference on Programming Language Design and Implementation, <https://dl.acm.org/citation.cfm?id=1250743> , 2007, pp. 66-77.

Dawei, Shi, et al., "Dynamic Self-Modifying Code Detection Based on Backward Analysis", Proceedings of the 2018 10th ACM International Conference on Computer and Automation Engineering,<https://dl.acm.org/citation.cfm?id=3193016>, 2018, pp. 199-204.

Kushwaha, Dharmender Singh, et al., "A Modified Cognitive Information Complexity Measure of Software", ACM SIGSOFT Software Engineering Notes, vol. 31, Issue 1, Jan. 2006, <https://dl.acm.org/citation.cfm?id=1108776>, 4 pages.

Piotr Bania, "Aslan Revisited", retrieved from the Internet: <http://web.archive.org/web/20131023055344/http://piotrbania.com/all/4514N/index_rev.html>, Oct. 23, 2013, XP055189758, 6 pages.

Wibowo, Andreyadi, et al., "Improving NORMALS Using Modified Baudot-Murray Code", Proceedigns of the 6th ACM International Conference on Communication and Network Security, <https://dl.acm.org/citation.cfm?id=3017984>, 2016, pp. 110-115.

* cited by examiner

SYSTEM AND METHOD TO MODIFY RUN-TIME BEHAVIOR OF AN APPLICATION BY MODIFICATION OF MACHINE-READABLE INSTRUCTIONS

CROSS REFERENCE TO RELATED APPLICATIONS

This application is a continuation application of U.S. patent application Ser. No. 15/121,234, filed Aug. 24, 2016 (which issued as U.S. Pat. No. 10,127,035 on Nov. 13, 2018), which is a National Phase application under 35 U.S.C. § 371 of PCT Application PCT/IB2015/051403, filed Feb. 25, 2015, which claims priority benefit to U.S. Provisional Application Ser. No. 61/944,134, filed Feb. 25, 2014, the contents of which are hereby incorporated by reference in their entirety.

FIELD

The disclosure relates to the modification of run-time characteristics of a program based on automated modification of machine-readable instructions.

BACKGROUND

Typically an application that is designed to be implemented on a computing platform is written in a high-level computer language (e.g. source code) and compiled. With the advent of online stores of applications (e.g. Apple's iTunes, Google's Play, and/or others) an increased number of applications are being written, compiled, and sold on the marketplace. When a developer wishes to change a feature of a released application he or she must search the source code to add, delete, and/or modify the feature and recompile the source code. The recompiled code can then be released commercially as a new version, including on iTunes, Play, and/or other application stores.

SUMMARY

One aspect of the present disclosure relates to a system of modification of behaviors of applications (e.g. at run-time) through a modification of the machine-readable instructions. This may be accomplished through modification of machine-readable instructions, such as bytecode, assembly code, and/or other machine-readable instructions of the application so that behaviors brought about through execution of the machine-readable instructions are modified in a desired manner. Modification of behaviors and/or features of the application may be accomplished without decompiling the application or modifying the source code (e.g. the typical development cycle). Implementing modifications may be accomplished by modifying the machine-readable instructions. The system may facilitate modification without accessing and/or re-coding the application at the high level computer language level (e.g., in source code or other human-readable code), and/or without requiring manual interaction with the machine-readable instructions. The system may facilitate modification of behavior of the application to be effected across multiple "builds" of the application (e.g., for distribution across different distribution platforms, for execution on different devices and/or operating systems, etc.) without having to manually make changes to individual builds.

The system may be configured to control implementation of an application (e.g. at run-time) by modification, addition, and/or removal of machine-readable instructions may include one or more physical computer processors. The one or more processors may be configured to execute components of machine-readable instructions. The components may include one or more of a pre-process application component, potential modification component, a rule generation component, a library generation component, a modification selection component, a modified application generation component, a distribution component, electronic storage, external resources, and/or other components.

The pre-process application component may be configured to obtain machine-readable instructions. The machine-readable instructions may, when executed, cause a target computing platform to implement an application. For example, run-time implementation of the application may occur when the application is executed. The machine-readable instructions may include instruction modules corresponding to features of the application. Features of the application may be an item of the application a developer wishes to modify. For example, features of the application may include aspects of the implementation of the application apparent to one or more of an operator (e.g. user) of the target computing platform, other devices in communication with the target computing platform (e.g., a server, a peer device, a second target computing platform, and/or other devices), and/or effectuating non-transitory storage of information to the target computing platform.

A feature of the application may be apparent to an operator of the target computing platform. For example, the feature may be apparent to the user based on sensory output (e.g., audiovisual output) generated by the target computing platform during implementation of the application. A feature of the application may be apparent to another device in communication with the target computing platform may include information and/or signals transmitted from the target computing platform to the other device during implementation of the application. The pre-process application component may be configured to obtain implementation information. Implementation information may characterize implementation of the application by the target computing platform. For example, information (e.g. auxiliary information and information defining features of the application) and/or documentation may be obtained characterizing implementation of the application. Documentation may include information characterizing the application, expression of the application at runtime, and/or functionality of the application. Information may include documentation.

Information (e.g. documentation) may be obtained to characterize the implementation of the application. Features of the application, documentation, ancillary information, and/or other sources of information may be used to characterize the implementation of the application. For example, monetization features of the application may include payment features of the application, advertising displays, and/or cross-promotion within the application. Monetization features may be used to characterize the implementation of the application. Information obtained characterizing implementation of the application may include analysis of end-user behavior. For example, communications of end-users with one another, end-user communications with features of the application, and or other communication resulting from end-user behavior may characterize implementation of the application.

Information to characterize implementation of the application may include displays of services within the application comprising display of internet search features, third-party authentication solutions, and/or features related to user login including social networking features. Information obtained characterizing implementation of the application may include coding methods including application standards of life-cycle management, the coding implementation at runtime, and/or coded management of the application.

The potential modification component may be configured to obtain a set of potential modifications to the application. For a given potential modification, potential modification component may obtain one or more of a feature or features which are modifiable via the given potential modification, changes possible to the modifiable feature(s), one or more instruction modules that correspond to the modifiable feature(s), and/or other information that facilitates effectuation of the given potential modification.

The rules generation component may be configured to create rules that define features of the application. Creation of the rules may be based on analysis of the machine-readable instructions, instruction modules, the implementation information, and/or other information. Rules may define one or more features of the application. The rules may describe and/or define the nature and or functionality of one or more features of the application. The rules may govern how modifications to specific instruction modules within the machine-readable instructions may effectuate the implementation modifications. For example, the rules may characterize how features interact with other features, what properties correspond to which features, how features communicate with other components and/or hardware (e.g. server), and/or other information. The rules may be held within a rules library. The rules library may include a set of potential modifications. For example, the rules library may include a set of rules describing the potential modifications, rules for achieving potential modifications, and/or other rules. In some embodiments, the rules library may or may not include machine-readable instructions (e.g. bytecode that is added).

Library generation component 118 may be configured to create an instruction store of instruction modules corresponding to features of the application. Creation of the instruction store may include identification of the instruction modules based on recognition of patterns of method calls and/or commands in the machine-readable instructions. For example, the instruction modules that are known to affect features of the application may be stored in an information store. The information store may be an instruction library. The instruction library may include one or more libraries of the application and/or instruction stores generated from installation and/or execution of the application. Instruction libraries may include machine-readable instructions for manifestations of modified features of the application. Instruction libraries may include a mediator for providing a logical layer between the application and the modified machine-readable instructions to characterize features of the application. Instruction library may include machine-readable instructions to facilitate communication between the mediator and the modified application. Instruction libraries may include a set of patterns, markers, and/or other instructions to assist the creation of modified machine-readable instructions or to assist in the identification of instructions to be modified.

Instructions libraries may enable machine based identification of code to be modified. Instructions libraries may include a set of instructions to control the modified machine-readable instructions implementation with the application.

Modification selection component may obtain implementation modification to effectuate in the run-time implementation. Implementation modification may be from the set of potential modification obtained by potential modification component. The implementation modification may be input by a developer directly, selected from a set, generated from the rules and/or the rule library, and/or obtained from other sources. For example, the machine-readable instructions may be modified to add a feature to the application. The added feature may be operationally compatible with the unmodified run-time implementation of the application.

Modified application generation component may modify the machine-readable instructions to effectuate the implementation modification obtained from the modification selection component. The modification of the machine-readable instructions may effectuate one or more of a modification of a feature of the application, an addition of a feature to the application, and/or a removal of a feature from the application, and/or other potential modifications. The modification of the machine-readable instructions may be determined based on the rules, the rules library, and/or other instructions.

Modified application generation component may create, manifest or comprise a replacement instruction module linked to an instruction module within the machine-readable instructions. A wrapping-engine may be one instance of a modified application generation component. The replacement instruction module may correspond to features of the application that may be modified by replacement of the machine readable instructions with the replacement instruction module associated with the selected implementation modification. For example, the modified application generation component may add instruction modules to the obtained machine-readable instructions. The added instruction modules may manifest a mediator to control and/or automate modification of the machine-readable instructions for subsequent automated implementation modification to the machine-readable instructions. Modification of machine-readable instructions may include automating implementation modification of one or more rules.

Distribution component 124 may distribute the modified machine-readable instructions to the target computing platform to effectuate implementation by the target computing platform of the application with the implementation modification.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

As used herein, the singular form of "a", "an", and "the" include plural references unless the context clearly dictates otherwise.

As used herein, the term developer may include one or more of distributors, sellers, developers, computer programmers, and/or others involved with the creation and/or distribution of machine-readable instructions.

As used herein machine-readable instructions are computer instructions that are machine specific. Machine-readable instructions may include bytecode, assembly code, machine code, and/or other computer instructions that can be understood by the computer. As used herein, machine-readable instructions may be different from source code (e.g. code developed by a computer programmer) because machine-readable instructions may be understood at the machine level and/or because machine-readable instructions may include machine specific instructions. Source code may be converted into machine-readable instructions (e.g. compiled). As used herein, source code may comprise human readable programming code. Machine-readable instructions may include instructions that are analyzed locally by the machine (e.g. computer). Machine-readable instructions may be machine specific. Machine-readable instructions may be runtime environment specific. For example machine-readable instructions (e.g. bytecode) may be distributed to java virtual machines.

As used herein, modify, and any conjugations, may include addition, removal, deletion, change, and/or other modifications. Modification of machine-readable instructions to modify behavior of a feature may include addition and/or deletion of machine-readable instructions.

Figure 1:
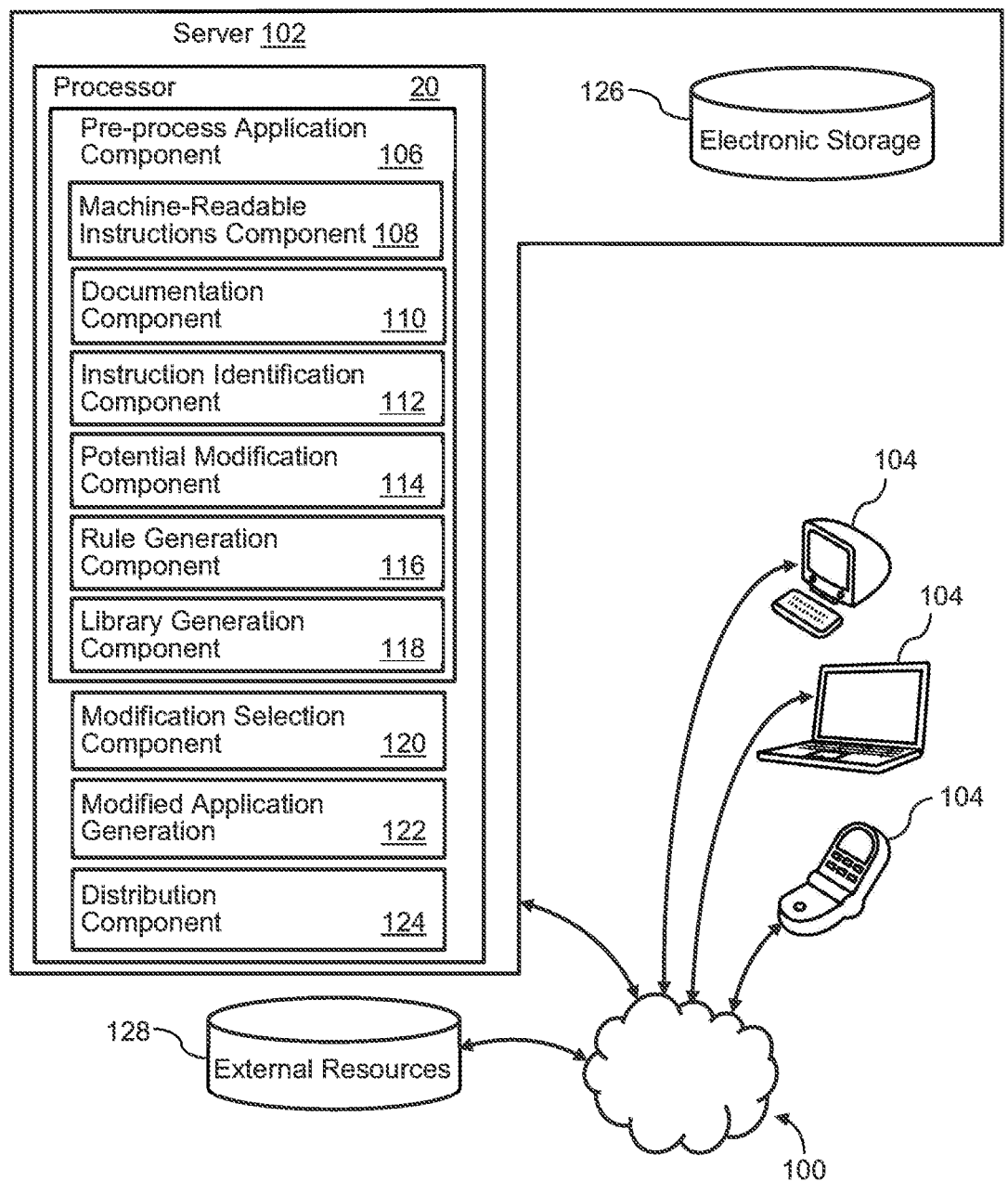
FIG. 1 illustrates a system of modifying application implementation of an application through modification of machine-readable instructions.

FIG. 1 schematically illustrates a system 100 configured to modify implementation (e.g. at run-time) of an application through modification of machine-readable instructions. Applications may be distributed through numerous on-line distribution services (some are referred to as "stores") (e.g. iTunes, Google Play, and/or many other distribution services). Regulations, rules, commercial requirements, and/or other requirements often have conflicting requirements for the distributed machine-readable instructions on these on-line distribution services. Governing commercial regulations, national regulations, territorial regulations, and/or other regulations may require commercial fragmentation of distributed applications. Technical fragmentation may occur based on the numerous end-user computing devices available on the market. Regulatory, commercial, and/or technical fragmentation cause an application distributor to create differing builds in order to comply with the market requirements, regulations, and/or technical needs.

System 100 may be configured to modify implementation of an application. System 100 may allow developers to maintain code, test, compile, and/or otherwise develop an application without maintaining the source code for each build. Developers may include one or more of distributors, sellers, developers, and/or others involved with the distribution of machine-readable instructions. System 100 may enable developers to enhance distribution channels while managing costs of creating, testing, and/or maintaining software builds. System 100 may enable substitution, alteration, and/or modification of features of an application without requiring the developer to have access to the applications source code. System 100 may enable the modification of features of a compiled application to offer different builds of the application to different distribution points (e.g. due to fragmentation). As is discussed herein, modification of features of a compiled application may be performed by making corresponding modifications to machine-readable instructions which cause a computing platform to implement the application. System 100 may enable modification of an application that has been compiled during implementation; as such, system 100 may alleviate and/or remove, at least in some cases, the need to obtain the source code to modify features of the application.

System 100 may be configured to obtain and analyze machine-readable instructions in order to modify the machine-readable instructions and distribute the modified machine-readable instructions to be implemented by the target computing platform 104. System 100 may include one or more of a server 102, one or more target computing platforms 104, and/or other features. Server 102 may include one or more physical computer processors 20. The one or more processors 20 may be configured to execute one or more components. The components may include one or more of a pre-process application component 106, potential modification component 114, a rule generation component 116, a library generation component 118, a modification selection component 120, a modified application generation component 122, a distribution component 124, electronic storage 126, external resources 128, and/or other components.

Pre-process application component 106 may be configured to obtain machine-readable instructions and/or implementation information characterizing implementation of the application. Pre-process application component 106 may obtain machine-readable instructions that, when executed, cause a target computing platform 104 to implement the application. The machine-readable instructions may include instruction modules that are correlated to features of the application. Pre-process application component 106 may obtain implementation information characterizing implementation of the application on the target computing platform 104. Pre-process application component 106 may obtain information from a variety of sources to characterize implementation of the application. For example, pre-process application component 106 may obtain information characterizing implementation of the application from documentation characterizing the application, expression of the application at runtime, functionality of the application and/or other sources of information. Pre-process application component 106 may include one or more of a machine-readable instructions component 108, a documentation component 110, and instruction identification component 112, a potential modification component 114, a rule generation component 116, and/or a library generation component 118. Pre-processing an application may comprise a first phase of feature modification (e.g. Phase 1 in FIG. 2).

Machine-readable instructions component 108 may be integrated into the normal creation and distribution of the application. Phases of a normal process of generating machine-readable instructions may include development and compilation, distribution, installation, and/or application execution. As such, machine-readable instructions may be created from source code that is compiled to generate the machine-readable instructions. The machine-readable instructions may then be distributed, installed on client-specific computing platforms 104 and executed. Machine-readable instructions component 108 may be configured to obtain information characterizing the implementation of the application from one or more of these sources including the source code, compiled machine-readable instructions, distribution life cycle, distribution channels, implementation of the application, and/or other sources.

Machine-readable instructions component 108 may be configured to obtain information characterizing implementation of the application after distribution. For example, machine-readable instructions component 108 may be used to obtain information when the source code is unavailable. Machine-readable instructions component 108 may be configured to obtain a distributed application and/or implement the application to obtain information characterizing implementation of the application (e.g. at run-time). The information obtained characterizing the implementation of the application (e.g. at run-time) may comprise monetization features of the application. Monetization features of the application may include payment features of the application, advertising displays, cross-promotion within the application, and/or other features. For example, the machine-readable instructions component 108 may obtain machine-readable instructions that define payment features of the application to determine specific instruction modules of the machine-readable instructions that can be modified to control the payment features. Advertisements and/or cross-promotion features of the application may similarly be used to determine specific instruction modules that effect monetization features. One or more monetization features may be obtained and/or analyzed.

Machine-readable instructions component 108 may obtain information characterizing implementation of the application including end-user behavior. End-user behavior may include communications of end-users with one another (e.g. other end-users) and/or features of the application (e.g. the server). Machine-readable instructions component 108 may be configured to obtain these communications to determine implementation information characterizing implementation of the application on the target computing platform.

Machine-readable instructions component 108 may obtain information characterizing implementation of the application including services displays within the application. For example, machine-readable instructions component 108 may obtain information within the application including display of internet search features, third-party authentication solutions, features related to user login including social networking features, and/or other features. Machine-readable instructions component 108 may obtain display or promotion of other services or application within the application with or without the direct purpose of generating revenue. Display and/or implementation of internet search procedures and/or providers, may be obtained. Machine-readable instructions component 108 may be configured to obtain features related to authenticating users through third party solutions, user login features, social network features including authentication through social network features and/or other features of the application.

Machine-readable instructions component 108 may obtain information characterizing implementation of the application coding methods and/or standards. For example, application coding methods and/or standards may include standards of life-cycle management (e.g. separate from and/or integrated in the application), the coding implementation at runtime, practices governing runtime management of the applications life-cycle, general coding implementations, coded management of the application, and/or other coding methods and/or standards.

Documentation component 110 may obtain information characterizing implementation of the application from technical documentation and/or other ancillary documentation related to the application. Documentation component 110 may obtain information characterizing implementation of the application from machine-readable instructions component 108. For example, documentation component 110 may obtain information from technical support webpages, instruction manuals, blog-posts, end-user questions and answers, metadata in the application, and/or other sources of information related to the application. Documentation component 110 may parse previous versions of an application (e.g. compiled builds of previous versions of the application), current versions of the application (e.g. compiled builds of the current version of the application), documentation related to recent releases, application coding standards, and/or other documentation to obtain information related to the implementation of the application. Documentation component 110 may be prepared by a user of the invention. For example, a user of the invention may analyze the machine-readable instructions, create one or more libraries (e.g. by library generation component discussed in detail below), and/or obtain other information related to the implementation of the application.

Documentation component 110 may obtain manual analysis of the implementations of features to be modified. For example, a user of the invention may analyze the applications compiled machine-readable instructions, source code, non-compiled forms, blog entries, and/or other information characterizing implementation of the application, and/or implementation of features of the application. The user of the invention may study general coding standards, obtain aspects of an operating system, analyze related applications, and/or obtain other information to characterize implementation of the application. The manual work to obtain information may be used to create rules, patterns, libraries, and/or other components of machine-readable instructions characterizing the obtained implementation modification. New methods of implementation may be added to the potential modifications and/or features to be implemented. The new methods of implementation may be codified through creation of additional information libraries of the patterns, rules, logic, and/or other machine-readable instructions to be modified.

Documentation component 110 may obtain information to characterize the implementation modification that does not result in modifications to the machine-readable instructions. For example, documentation component 110 may be used to obtain information (e.g. manually or otherwise) to analyze, study, and/or learn about how the machine-readable instructions characterize features of the application. The obtained information may or may not be actively modified and/or used within the wrapped application 222 (e.g. as described below).

Instruction identification component 112 may be configured to obtain implementation information characterizing implementation of the application from modification of the machine-readable instructions to observe changes in the features of the application. Specific instruction modules of the machine-readable instructions may be determined to effect features of the application through modification of the machine-readable instructions. Features of the application may be controlled by several instruction modules within the machine-readable instructions. For example, a monetization feature of the application may include different sections of machine-readable instructions that define the operation of the monetization feature. Instruction identification component 112 may be configured to obtain information characterizing the implementation of the monetization feature by observing machine-readable instructions that affect the monetization feature and/or through modification of machine-readable instructions to observe which feature(s) of the application are modified. Instruction identification component 112 may be configured to observe patterns in the machine-readable instructions to obtain instruction modules that effect features of the application. For example, instruction modules may observe patterns of method calls, if/then statements, jump, read, and/or other machine-readable instructions that correspond to features of the application. Instruction modules may be configured to use previous instruction modules to predict the effect of the machine-readable instructions on application features.

Instruction identification component 112 may be configured to obtain implementation information characterizing implementation of the application by a user of the invention through analysis of machine-readable instructions, creation of initial rules, patterns, and/or other components. Documentation component 110 and instruction identification component 112 may be more or less automated, such that a user of the invention may maintain bookmarks, documents, and/or obtain other information to build an instruction module to obtain information characterizing implementation of the machine-readable instructions.

Potential modification component 114 may be configured to obtain a set of potential modifications to the application. Obtaining a potential modification may include determining the potential modification (e.g., from the implementation information and/or based on other criteria), accessing the potential modification from storage, receiving user input indicating the potential modification, receiving network communication indicating the potential modification, and/or obtaining the potential modification from other sources. For a given potential modification, potential modification component 114 may obtain one or more of a feature or features which are modifiable via the given potential modification, changes possible to the modifiable feature(s), one or more instruction modules that correspond to the modifiable feature(s), and/or other information that facilitates effectuation of the given potential. Potential modification component 114 may analyze the compiled application to identify areas which may be potentially modified. Potential modification component 114 may determine areas of the machine-readable instructions that may be modified based on the analysis, and/or other obtained information (e.g. from one or more of components 108, 110, 112, and/or other components).

Rule generation component 116 may be configured to create rules that define features of the application before and/or after modification. Rule generation component 116 may analyze the information received from one or more components of pre-process application component 106 and/or documentation component 110 to create rules defining features of the application. Rule creation may be based on analysis of the machine-readable instructions, instruction modules, the implementation information, and/or other information. Rule generation component 116 may be configured to create programmatic rules that govern code addition, replacement, and/or modifications in order to modify features of the application. Rule generation component 116 may create strings of machine-readable instructions that may be applied to target features and/or instruction modules. A rule to control one feature of an application may include several instruction modules of machine-readable instructions. Rule generation component 116 may use prior analyses of machine-readable instructions to create one or more heuristics to match instruction modules of machine-readable instructions to features of the application. Rule generation component 116 may analyze information obtained from patterns in the machine-readable instructions observed to effect features of the application. For example, the instruction identification component 112 may modify one or more aspects of the machine-readable instructions to effect features of the application. Rule generation component 116 may analyze information to create rules that modify the features of the application without changing the functionality of the application. As such, rule generation component 116 may modify, or govern the modification of, features of the application that function with unmodified features of the application.

Rule generation component 116 may govern modifications based on the generated rules to specific instruction modules within the machine-readable instructions and/or to effectuate the implementation modification. For example, rules generated from the obtained sources of information may control selection of the features, what potential modifications are available in potential modification component 114, and/or other potential modifications to the application.

Rule generation component 116 may be configured to modify a compiled application. For example, rule generation component 116 may be configured to add (e.g. insert modified machine-readable instructions) and/or remove one or more parts of the existing compiled machine-readable instructions. Rule generation component 116 may provide machine-readable instruction manifestations of the features (e.g. a replacement billing information, replacement advertising provider, and/or other features). Rule generation component 116 may be configured to add, or govern the addition of, and/or modify a mediator 224 (e.g. as described in detail below). Mediator 224 may be configured to provide a logical layer between the compiled application and/or some or all of the modified machine-readable instructions. Rule generation component 116 may be configured to modify machine-readable instructions to facilitate the communications between the mediator, features within the modified application, and/or features, components and/or other entities outside the application. For example the rules generated may be achieved through modification, deletion, and/or addition of machine-readable instructions in the application being wrapped.

Figure 2:
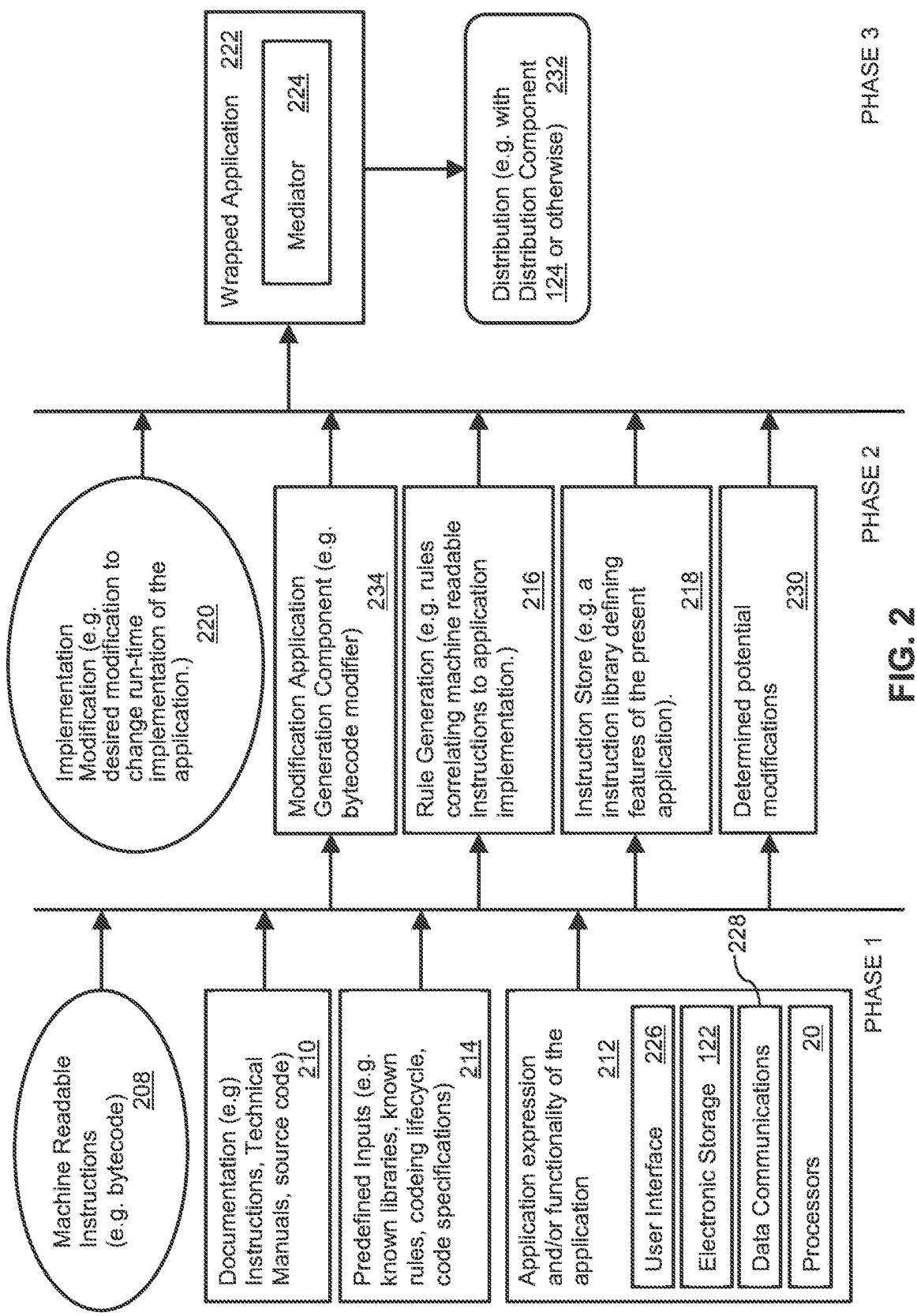
FIG. 2 illustrates an overview of the phases of the automated modification of application implementation.

FIG. 2 illustrates a rule generation component 216 in the second phase of application modification (e.g. Phase 2). Phase one (e.g. pre-processing an application) may not need to be repeated for every application. FIG. 2 is illustrative only, and is not intended to be limiting. For example, phase one may occur independently of phase two. Phase two may occur independently of phases one and three. Some functions illustrated, for example, in phase one of FIG. 2 may be performed in phase two and/or phase three, and/or may occur out of sequence.

Rule generation component 216 may be the same or similar to rule generation component 116, as shown in FIG. 1 and described herein. The obtained machine-readable instructions 208 may be obtained from machine-readable instructions component 108 as shown in FIG. 1 and described herein. Documentation 210 (e.g. obtained from documentation component 110 shown in FIG. 1 and described herein), predefined inputs 214 (e.g. obtained from potential modification component 114, shown in FIG. 1 and described herein), application expression 212 (e.g. obtained from instruction module 112, as shown in FIG. 1 and described herein), and/or other obtained information may contribute to the analysis of rule generation component 216 to generate one or more rules correlating specific instruction modules (e.g. parts of machine-readable instructions 208) to application features (e.g. processor 20, electronic storage 126, application expression 212, user interface 226, and/or data communications 228).

A modification application generation component 234 may be configured to modify feature implementation at run-time in phase two. A wrapping engine may be one instance of modification application generation component 234. Modification application generation component 234 may include modified machine-readable instructions of the compiled application. For example, the modification application generation component 234 may include modified machine-readable instructions, one or more rules (e.g. created with rule generation component 216), one or more information stores (e.g. information stores, information libraries, rule libraries and/or other information stores), wrapped application 222, mediator 224, and/or other machine-readable instructions modified to implement modifications of behavior of the application. Modification application generation component 234 may obtain an unwrapped application and modify one or more features of the application through modification of machine-readable instructions characterizing features of the unwrapped application. Modification application component may generate wrapped application 222. Modification application generation component 234 may comprise implementations of potential modifications (e.g. from potential modification component 114 as shown in FIG. 1). Modification application generation component 234 may include machine-readable instructions from pre-process application component 106 (e.g. as shown and described in FIG. 1), a component of pre-process application component 106, and/or other components.

Modification application generation component 234 (e.g. the same as or similar to modified application generation component 122 as described herein and illustrated in FIG. 1) may receive potential modifications to be implemented from modification selection component 120. Modification application generation component 234 may enable implementation of the determined potential modifications based on information within one or more libraries created with the library generation component 118 (e.g. including one or more of the libraries described for library generation component 118). Modification application generation component 234 may implement modifications to features of the application by cleaning aspects of the modified machine-readable instructions and/or ensuring that the machine-readable instructions remain executable. Modification application generation component 234 may include machine-readable instructions characterizing the modified features of the application, mediator 224, and/or machine-readable instructions to communicate between one or more libraries, and/or other machine-readable instructions to enable implementation of modified features of the application.

Application expression 212 and/or functionality of the application may include all the features of the application that contribute to the operator's (e.g. end-user's) experience. For example, the application expression 212 may include one or more user interfaces 226, electronic storage 122, data communications 228, and/or processors 20. Application expression 212 may be used to obtain information, analyze machine readable instructions, and/or generate rules.

For example, user interface 226 may enable a user of the invention to view one or more existing or potential features of an application for which modification of one or more features is desired. User interface 226 may be configured to present to the user of the invention the individual features of the application. For example, user interface 226 may display costs of a wrapped application (e.g. user costs) associated with individual monetization features of the application to the user of the invention, as they may appear to the operator of the wrapped application. The application expression 212 may be configured to effectuate display of the user interface 226 on the one or more target computing platform(s) 104 (as shown in FIG. 1 and described herein) which may be different from the target computing platforms for which the application and subsequent wrapped application has been created. This may include providing information about individual features to the target computing platforms 104 (shown in FIG. 1) and/or rule generation component 216. User interface 226 may be implemented through one or more websites hosted on one or more web servers. For example, target computing platforms 104 (as shown in FIG. 1) may access the website(s) via the Internet. User interface 226 may be implemented via one or more target computing platforms associated with the institution, the target computing platforms 104 communicating with the server(s) 102 (as shown in FIG. 1 and described herein) over a network. For example, the application may use the institutions features within one or more components operated and maintained by the institution. User interface 226 may be configured to display information relating to the activities undertaken in phase 1 and/or phase 2 as component user interfaces (e.g. a user interface 226 for the user of a wrapping engine 416, a documentation component 110, and/or other features and/or components of the invention). User interface 226 may be configured to display some or all of the features that may be modified.

The user interface 226 may be configured to receive selection and/or entry by the user and/or user of the invention of individual features. The user may use a target computing platform 104 (as shown in FIG. 1) to make selections and/or entries of individual features displayed on user interface 226 to modify, as desired. The target computing platform 104 (as shown in FIG. 1) may be configured to display, to the user, the individual features, and may comprise one or more input devices configured to facilitate selection of one or more of the individual features.

Other user interfaces may be configured to display modified features to the end-user (e.g. operator) of the wrapped application (e.g. by the wrapped application) during run-time of the wrapped application. For example, the purchase flow of an in-application payment provider and/or advertising display may be invoked directly or indirectly by the mediator. These features and/or parts of features may be invoked, for example, if an operator chooses to purchase, the purchase flow for a replacement payment provider is presented to the user. The mediator may be configured to determine one or more of the activities to present user interface 226. User interfaces presented to the operator of the wrapped application may be governed in whole or in part by the modified features. In some embodiments, one or more features may be separate from user interaction (e.g. automatic presentation of advertising). For example, the mediator and/or machine-readable instructions may determine manifestations of the modified features. User interfaces (226 and/or others) may be presented using a manner of technologies (e.g. html, native UI components, flash, and or other technologies).

Data communications 228 may enable features of an application that an operator would expect from the application. For example, data communications 228 with a server to fetch a web page, and/or operate other features of the application. Application expressions 212 of data communications with other operators (e.g. end-users), other devices within system 100, and/or other data communications may be obtained and analyzed by system 100 to generate rules correlating machine-readable instructions to application implementation.

Features of the application that may be analyzed to generate rules may include electronic storage 122 of the application and/or processors 20 that are used during execution of the application. The functionality of these components may be explained elsewhere in the application. Rule generation component 216 may analyze information obtained from these sources to generate rules that correlate machine-readable instructions to features of application implementation.

Returning to FIG. 1, library generation component 118 may be configured by computer readable instructions to create an instruction store of instruction modules corresponding to features of the application. The creation of the instruction store including identification of the instruction modules may be based on recognition of patterns of method calls and/or commands in the machine-readable instructions. For example, the information stores may provide the ability to add features and functionality that were not present in the original development of the application. This may enable the modifications to be operationally functional with the application. Information stores may allow a developer to use features and functionality of a compiled application and alter how and whether features of the application are implemented, displayed to the operator, and/or modified. Information stores may enable feature or features implementation that are added or modified without requiring operator interaction. Library stores may enable an automated and/or programmatic processing step for rule generation component 116. In this configuration, library stores may limit a user of the inventions interaction of the implementation modification to select one or more of a set of library stores of potential modifications. Instruction stores may comprise potential modifications on compiled machine-readable code that enable modification of an application without decompiling the machine-readable instructions.

Library generation component 118 may include instruction stores and/or an instruction library. For example, library generation component may include instruction stores of potential modifications, generated rules, and one or more instruction libraries of compiled code. Library generation component 118 may have instruction libraries for generated rules, potential modifications, and/or features of the unmodified application. For example, features of the unmodified application may be held in an information library.

Library generation component 118 may create an information store for the generated rules. For example, the generated rules may be held within a rules library, generated by library generation component 118. The rules library may further include a set of potential modifications (e.g. from potential modification component 114) to features of the application made possible through the generated rules library and/or the generated instruction library. Potential modifications may be the result of combining one or more rule libraries, instructions stores, and/or instruction libraries. For example, a generated rules library and a generated instruction library may combine and/or define potential modifications of features of the application.

Library generation component 118 may create instruction libraries including machine-readable instructions required for machine-readable manifestations of the features being modified, a mediator 224 (e.g. as described below), machine-readable instructions for facilitating the communication with the modified application, and/or other machine-readable instructions and/or rules. For example, one library may be configured to create a library for each type of mediator determined to configure one or more features of the application. For example, a library may include machine-readable manifestations of the features and/or modifications that may be added to the application (e.g. machine-readable instructions corresponding to a particular billing, advertising, provider, and/or other features). A library may include machine-readable instruction manifestations of mediator 224. A modification implementation of a feature may include a mediator to effectuate the modification implementation (e.g. one mediator may be provided for replacement of payment provider A and another mediator may be provided for replacement of payment provider B). A mediator 224 may be implemented for a feature that is added to the compiled machine-readable instructions. A library may include machine-readable manifestations of modifications to communicate with one or more mediator(s) to the modified application. Implementation details may vary across applications. As such, there may be more libraries created than mediators 224.

Library generation component 118 may be configured to create a set of instruction libraries including patterns and markers obtained by the machine in order to implement the machine-readable instructions at run-time. Library generation component 118 may be configured to create a set of machine-readable instructions to determine how the rules should govern application of modifications to the application.

Referring to FIG. 2 illustrating an instruction store 218, the instruction store can include instruction stores from one or more features of the unmodified application (e.g. components 20, 122, 208, 210, 212, 214, 226, and/or 228), from the rule generation component 216. In addition, instruction store may obtain information from the implementation modification 220 and/or from the determined potential modifications (e.g. based on the rule generation component analysis 216) to create information stores of machine-readable instructions of the implementation modification features and/or determined potential modification features of the application. Library generation component 218 may store one or more of these information stores in information libraries.

Returning to FIG. 1, modification selection component 120 may be configured to obtain an implementation modification to effectuate in the run-time implementation. Modification selection component 120 may modify machine-readable instructions to add a feature to the application. The feature added to the application may be operationally compatible with the run-time implementation of the application. For example, the modified feature may connect, interact, exchange information, utilize, and/or otherwise be compatible with the features and/or properties of the unmodified features within the application.

Modified application generation component 122 may be configured to modify the machine-readable instructions to effectuate the implementation modification. The modification of the machine-readable instructions may effectuate a modification of a feature of the application, an addition of a feature to the application, a removal of a feature from the application, and/or other modification of the application. The modification of the machine-readable instructions may be determined based on the generated rules.

As illustrated in FIG. 2 modification application generation component 234 (e.g. the same as or similar to modified application generation component 122 as shown in FIG. 1) may create a wrapped application 222 that includes a replacement instruction module or one or more individual machine readable replacement instructions which may be linked to an instruction module within the machine-readable instructions corresponding to features associated with the implementation modification. For example, a replacement instruction module may be selected as an implementation modification. At some time before implementation, replacement instruction module and/or individual instructions may obtain rules correlating machine-readable instructions to the corresponding replacement features at application or feature implementation.

The wrapped application 222 may comprise instruction modules and/or one or more individual instructions added to the obtained machine-readable instructions. The wrapped application 222 may comprise instruction modules that manifest a mediator 224. Wrapped application 222 may include modified, added, deleted, and/or other machine-readable instructions to characterize the functionality of the application. Wrapped application 222 may include modified, added, deleted, and/or other machine-readable instructions to implement the desired functionality of the application. Wrapped application 222 may or may not include machine-readable instructions from the compiled application. Machine-readable instructions may be modified, added, and/or deleted to characterize manifestations of features, characterizations of features, implementations of features, and/or otherwise improve the functionality of the features. For example, machine-readable instructions may be modified, added, and/or deleted to improve communications of the wrapped application with the target computing platform 104 (e.g. including the run-time environment and/or other software on the local platform), remote hardware/software, and/or other interfaces.

The mediator 224 may control and/or automate modification of the machine-readable instructions. Mediator 224 may enhance communication of components of the implementation modification to components of the features of an application. Mediator 224 may enhance implementation modifications of the machine-readable instructions. Mediator 224 may change parts of features, feature calls, properties, and/or other components of the features of the application. Mediator 224 may control implementation modification based on one or more rules (e.g. generated by rule generation component 116) and/or information stores (e.g. generated by library generation component 118).

Mediator 224 may enhance the inter-operability of the application. Mediator 224 may reduce the number of required modifications to the machine-readable instructions to characterize one or more features of the wrapped application 222. Mediator 224 may comprise a set of pre-defined potential modifications (e.g. potential modification component 114). For example, mediator 224 may include pre-defined potential modifications that have been grouped together (e.g. in a set) as a consequence of a particular use (e.g. replacing a specific implementation of a specific feature). The functions of mediator 224 may be necessary to modify machine-readable instructions characterizing features of the wrapped application 222. However, in some embodiments, some or all the functions of mediator 224 may be performed by another component. The description of mediator 224 is not intended to be limiting, some or all the functions of mediator 224 may be performed by other components.

Distribution 232 (e.g. with distribution component 124) may be configured to distribute the modified machine-readable instructions to target computing platforms 104 (e.g. as shown in FIG. 1). Distribution 232 may enhance distribution to a variety of regulatory fragmented, commercially fragmented, and/or technically fragmented distribution sites. Distribution 232 may limit the cost of creating, testing, and/or maintaining software builds by automating the distribution process to these sites with machine-readable instructions that conform to the regulatory requirements, commercial requirements, and/or technical requirements of a larger array of software distributers. Distribution 232 may maximize distribution points while limiting the costs of distribution.

Figure 3:
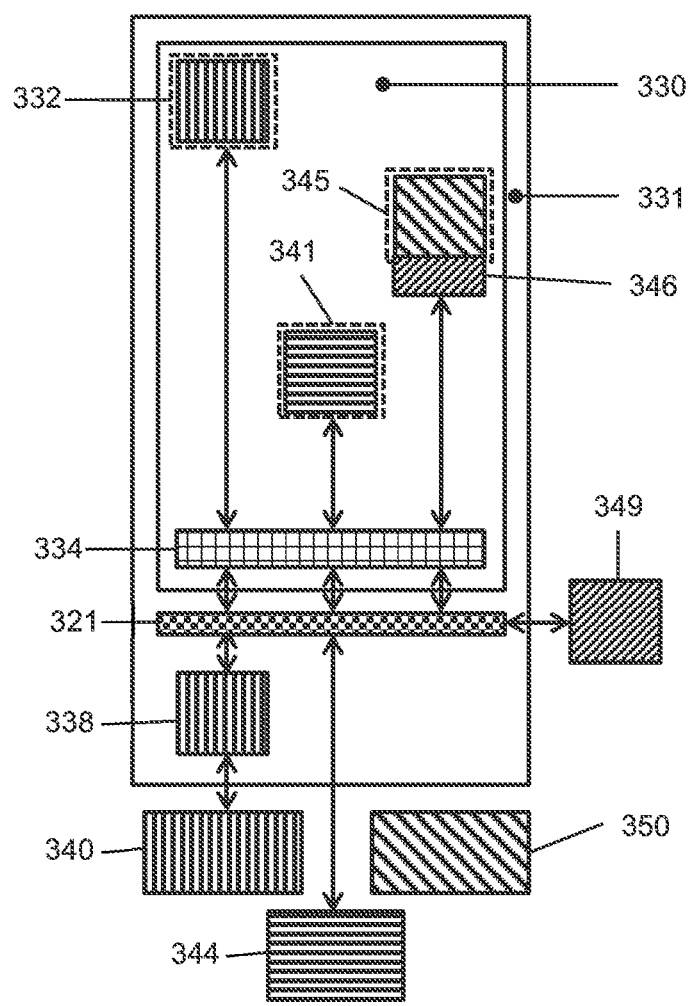
FIG. 3 illustrates a logical overview of feature implementation, utilizing a mediator. The wrapped application may interact with the device operating system, run-time environment, and/or supporting/modified code to modify the expression of one or more features of the application.

FIG. 3 illustrates a logical overview of implementation of a feature modification with a mediator 334 as implemented within a wrapped application. The mediator 334 machine-readable instructions may be added to control the application life cycle. Mediator 334 may construct and present a user interface. For example, mediator 334 may add a feature presenting an arbitrary message to an operator on application start-up. For example, mediator 334 may replace an application feature provider and/or implementation (e.g. payment provider A) with multiple providers. In this example, mediator 334 may actively utilize a user interface to select modified implementations presented to the operator.

Mediator 334 may be added to manage, alter, and/or add features to the application. Mediator 334 may allow modified or unmodified parts of application 330 to communicate with modified code 346 as well as expressed features of the modified code 341 and 345. Application 330 may be implemented within a run-time environment 331 (e.g. an operating system) on the target computing platform. Mediator 334 may communicate with an interface provided by run-time environment 321, information store 338, modified code 346 (e.g. rules), remote hardware 349 (e.g. a server), and/or other machine-readable instructions and/or features. For example, remote hardware 349 may include a server that is located outside of application 330 with which the application communicates. Mediator 334 may enable communication with the interface provided by the run-time environment 321 and/or remote hardware 349 after modification of the application. Mediator 334 may control modified code 346 obtained and/or stored in a run-time environment 331, information store 338, implementation logic of modified code 346 (e.g. modified machine-readable instructions resulting from one or more rule libraries), and/or may be free standing. Feature 332 illustrates an unmodified feature of application 330. For example, mediator 334 may use information store(s) 338.

Information store 338 may comprise supporting features 340 outside the run-time environment. Supporting features 340 may include information stores, implementation logic of modified code 346, business logic, remote software/hardware 349, servers 102, and/or other features of the application 330 external and/or internal to application 330. Mediator 334 may affect the communication between unmodified feature 332, modified feature(s) 341, 345, supporting features 340, and/or other features to further modify the features of application 330 during implementation.

Implementation modifications 220 (as shown in FIG. 2) may result in unutilized code 350. In one embodiment of the invention, unutilized code 350 may be code that has been replaced or modified and outside of application 330. In one embodiment of the invention, unutilized code may remain within the application 330 or may remain within and outside the application. Unutilized code 350 may include an implementation of a feature, server, code, application, and/or other software and/or hardware that has been replaced or modified by mediator 334 or other machine readable instructions. Unutilized code 350 may be replaced and/or lack communication with mediator 334 and therefore may not communicate with the implemented modification of application 330.

Application 330 may be run on one or more target computer platforms 104 (as shown in FIG. 1) and may be configured for a particular run-time environment 331. Mediator 334 may or may not affect communications of the application with the run-time environment 331 (e.g. operating system). The mediator 334 may target communications involved with the modified, added, and/or removed features and may not be involved with other communications. Some communication responses may be triggered by mediator 334 and some communication requests or responses may be direct between remote hardware/software and the application.

Figure 4:
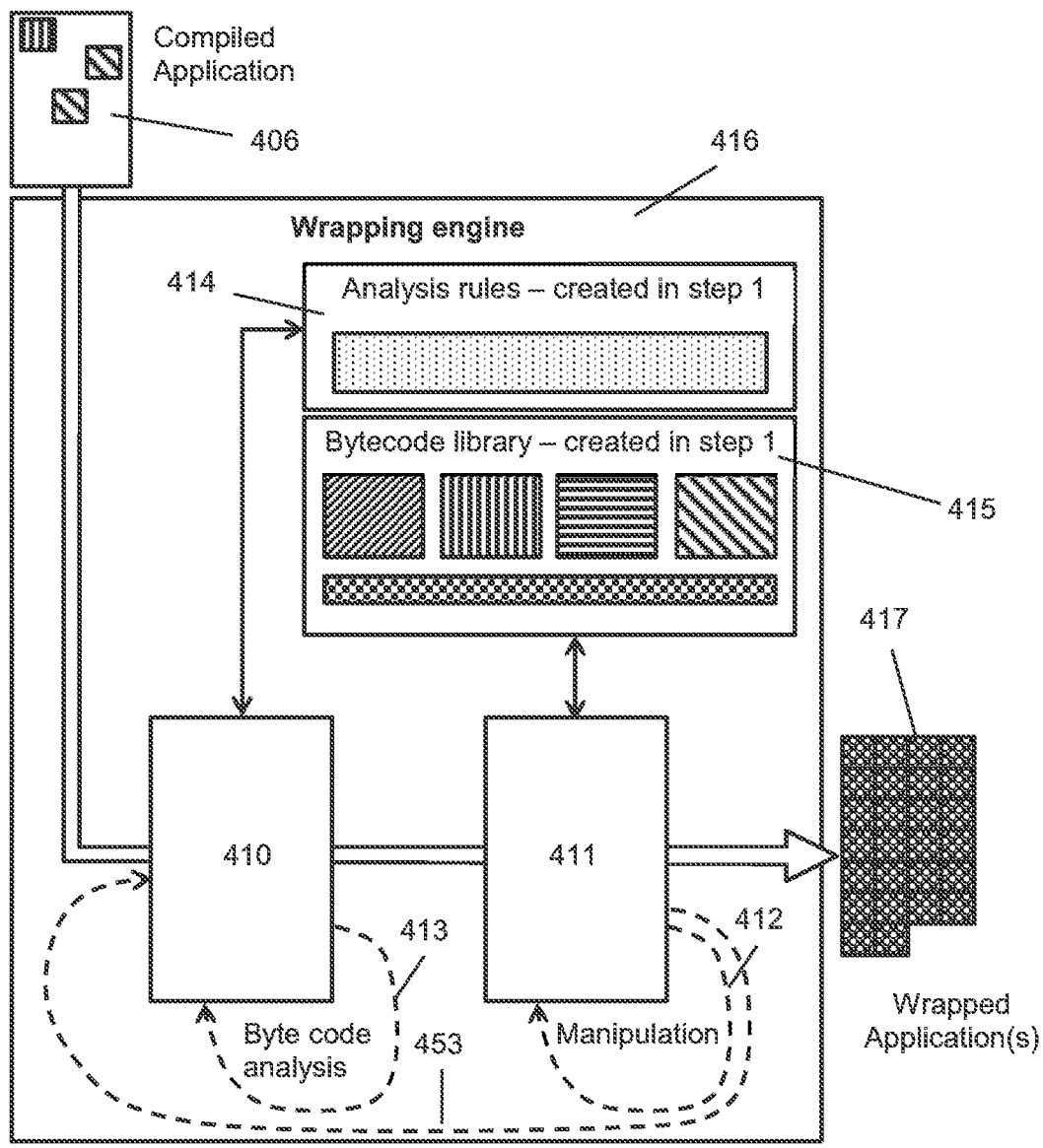
FIG. 4 illustrates machine-readable instructions manipulation analyzing machine-readable instructions and modifying the application rules in a modified application generation component to create a wrapped application.

FIG. 4 illustrates the automated post-compilation application code processing. Wrapping may involve automated processing of the compiled applications 406 features. The purpose of a modification application component 416 (e.g. wrapping engine) may be to create different builds of the application by modifying and/or replacing existing features of the application with modified features comprising the desired implementation modification. The process of post-compilation application code processing may begin with a compiled application 406. Post-compilation application code processing may be automated and/or manual. Compiled application 406 may be analyzed 410 and/or manipulated 411 to obtain a desired implementation modification 220 (shown in FIG. 2). Multiple manipulation iterations 412, and/or analysis iterations may be required to obtain the generated rules 414 and/or the information library 415 (e.g. with different components of phase 1 and/or phase 2 illustrated in FIG. 2). For example, machine-readable instruction sequence(s), instruction module(s) correlated to feature(s) of the application, generated rule(s), information store(s), and/or other information may be obtained and iterated 453 through both the analysis 410 and manipulator 411 multiple times to generate a wrapped application 417. Wrapping engine 416 may store the analysis rules 414 and/or the information libraries 415 in an information store (as described herein).

Returning to FIG. 1, distribution component 124 may be configured to distribute the modified machine-readable instructions to the target computing platforms 104 to effectuate implementation by the target computing platform 104 of the application with the implementation modification 220 (as shown in FIG. 2). Distribution component 124 may enhance distribution to a variety of regulatory fragmented, commercially fragmented, and/or technically fragmented distribution sites. For example, distribution component 124 may limit the cost of creating, testing, and/or maintaining software builds by automating the distribution process to these sites with machine-readable instructions that conform to the regulatory requirements, commercial requirements, and/or technical requirements of a larger array of software distributers. This enables the maximization of distribution points while limiting the costs of distribution.

Figure 5:
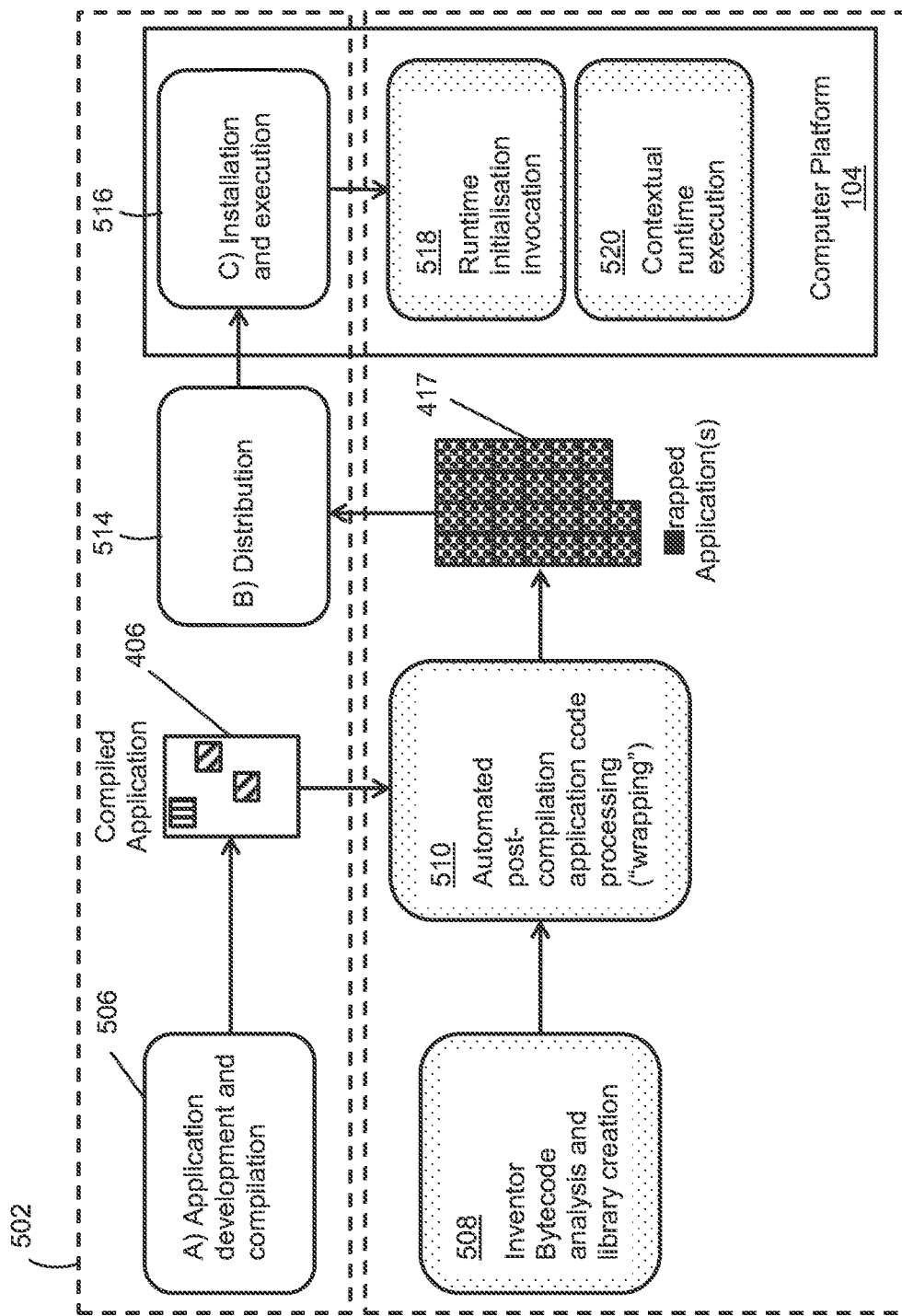
FIG. 5 illustrates how utilizing the present disclosure may result in a single associated build of an application that can be implemented across a broad group of distribution channels with different regulations.

FIG. 5 illustrates an overview of an exemplary configuration of the development and distribution of a modified application. FIG. 5 illustrates how the present disclosure can enhance the typical development cycle 502. One aspect of the invention relates to a scenario where typical development cycle 502 may not be available to a developer. A developer that does not have access to the typical development cycle 502 may have access to steps to modify run-time behavior of an application by modification of machine readable instructions including the outlined processes 504 of FIG. 5. For example, wrapping process 510 may enable the compiled application 406 to be modified (e.g. by wrapping process 510) and distributed 514, without requiring the developer to return to application development 506 (e.g. within the typical development cycle 502). Wrapping process 510 may enable multiple modifications of the compiled application 406 without requiring returning to application development 506 following each iteration. Obtaining and analyzing information 508 to generate rules, information stores, and/or libraries enables a post-compilation application processes that is automated. Wrapping 510 a compiled application based on the obtained and analyzed information 508 enables an application developer to develop 506 and distribute 514 modifications of the application 506 without having to modify and/or recompile the application source code. Such wrapped applications 417 can be distributed 514 to a variety of different computer platforms 104 with different run-time environments and/or operating systems. Operators and/or users of the invention may install and execute the wrapped application 517 comprising modified features that have been modified from the compiled application 506. The wrapped application 517 may affect the runtime initialization invocation 518, and/or the contextual runtime execution 520 of the compiled application 506.

Returning to FIG. 1, the server 102, target computing platforms 104, and/or external resources 108 may be operatively linked via one or more electronic communication links. For example, such electronic communication links may be established, at least in part, via a network such as the Internet and/or other networks. It will be appreciated that this is not intended to be limiting, and that the scope of this disclosure includes configurations in which servers 102, target computing platforms 104, and/or external resources 128 may be operatively linked via some other communication media.

A given target computing platform 104 may include one or more processors configured to execute computer program components. The computer program components may be configured to enable an operator and/or user of the invention associated with the given target computing platform 104 to interface with system 100 and/or external resources 128, and/or provide other functionality attributed herein to target computing platforms 104. By way of non-limiting example, the given target computing platform 104 may include one or more of a desktop computer, a laptop computer, a handheld computer, a tablet computing platform, a NetBook, a Smartphone, a gaming console, and/or other computing platforms.

External resources 128 may include sources of information, hosts and/or providers of virtual environments outside of system 100, external entities participating with system 100, and/or other resources. For example, the machine readable instructions component 108 may be configured to obtain the information indicating a user of the invention's influence in the virtual space from the external resources 128. External resources 128 may include business logic, technical manuals, data logs, and/or other information used to analyze and modify rules generated at run-time. Some or all of the functionality attributed herein to external resources 128 may be provided by resources included in system 100 (e.g. electronic storage 126).

Server 102 may include electronic storage, one or more processors 120, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 126 may comprise non-transitory storage media that electronically stores information. The electronic storage media of electronic storage 126 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor 20, information received from server 102, information received from target computing platforms 104, and/or other information that enables server 102 to function as described herein.

Electronic storage 126 comprises electronic storage media that electronically stores information. The electronic storage media of electronic storage 126 may comprise one or both of system storage that is provided integrally (i.e., substantially non-removable) with target computing platforms 104 and/or removable storage that is removably connectable to system 100 via, for example, a port (e.g., a USB port, a firewire port, etc.) or a drive (e.g., a disk drive, etc.). Electronic storage 126 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 126 may store software algorithms, information determined by processor 20, information received from an operator, information received from a user of the invention, and/or other information that enables system 100 to function properly. Electronic storage 126 may be (in whole or in part) a separate component within system 100, or electronic storage 126 may be provided (in whole or in part) integrally with one or more other components of system 100 (e.g., within target computing platforms 104).

Processor(s) 120 may be configured to provide information processing capabilities in server 102. As such, processor 20 may include one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. Processor 20 may include a plurality of processing units. These processing units may be physically located within the same device, or processor 20 may represent processing functionality of a plurality of devices operating in coordination. The processor 20 may be configured to execute components 106, 108, 110, 112, 114, 116, 118, 120, 122, 124, and/or other components. Processor 20 may be configured to execute components 106, 108, 110, 112, 114, 116, 118, 120, 122, 124, and/or other components by software; hardware; firmware; some combination of software, hardware, and/or firmware; and/or other mechanisms for configuring processing capabilities on processor 20. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 106, 108, 110, 112, 114, 116, 118, 120, 122, 124 are illustrated in FIG. 1 as being implemented within a single processing unit, in configurations in which processor 20 includes multiple processing units, one or more of components 106, 108, 110, 112, 114, 116, 118, 120, 122, 124 may be implemented remotely from the other components. The description of the functionality provided by the different components 106, 108, 110, 112, 114, 116, 118, 120, 122, 124 described below is for illustrative purposes, and is not intended to be limiting, as any of components 106, 108, 110, 112, 114, 116, 118, 120, 122, 124 may provide more or less functionality than is described. For example, one or more of components 106, 108, 110, 112, 114, 116, 118, 120, 122, 124 may be eliminated, and some or all of its functionality may be provided by other ones of components 106, 108, 110, 112, 114, 116, 118, 120, 122, 124. As another example, processor 20 may be configured to execute one or more additional components that may perform some or all of the functionality attributed below to one of components 106, 108, 110, 112, 114, 116, 118, 120, 122, 124.

Figure 6:
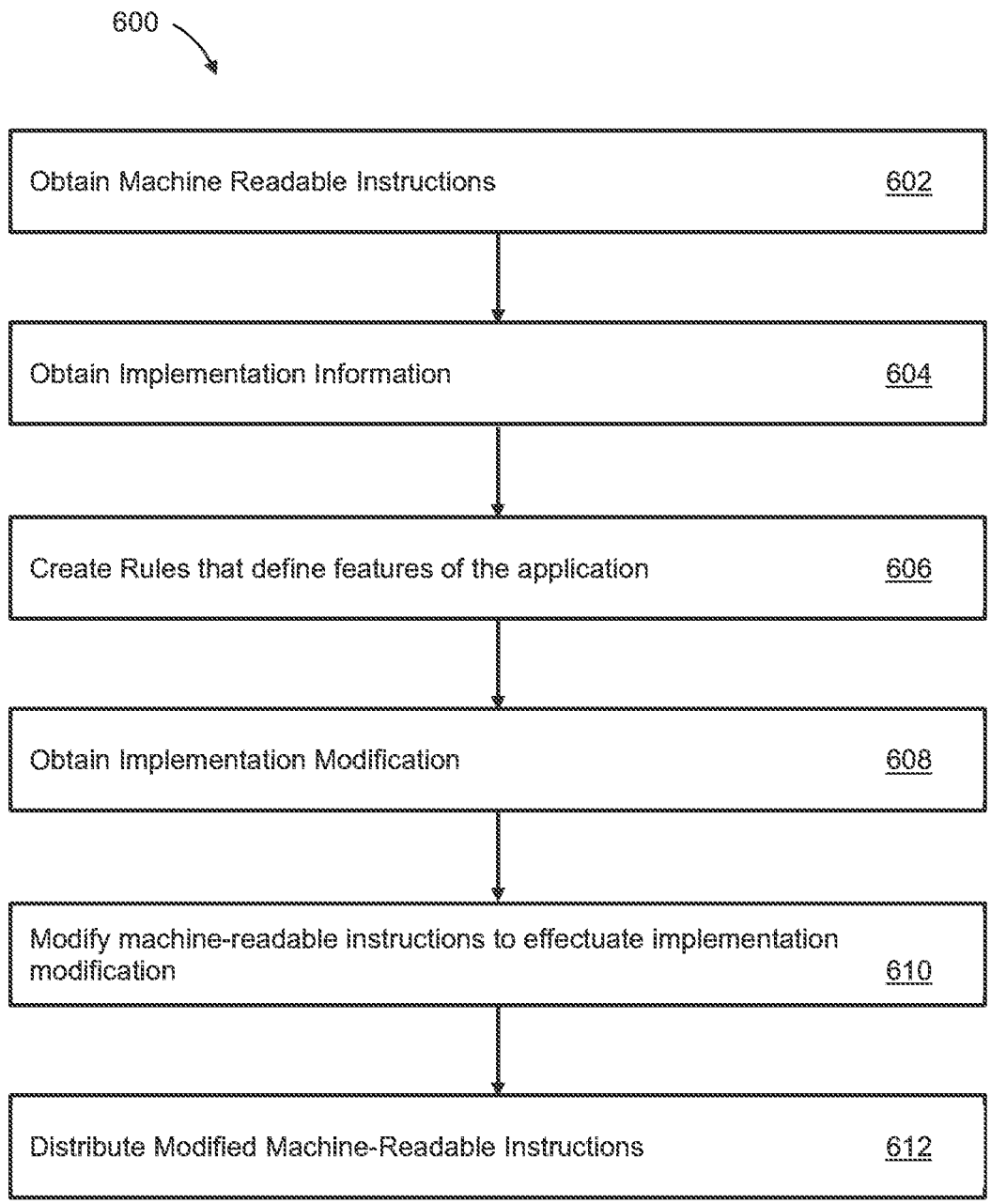
FIG. 6 illustrates a method of modifying application implementation of an application through modification of machine-readable instructions.

FIG. 6 illustrates a method 600 for modifying application implementation by modification, addition, and/or removal of machine-readable instructions. The method may be implemented on a computer system including one or more physical processors and include storage media storing machine-readable instructions. The computer system comprises one or more physical processors and storage media storing machine-readable instructions. The operations of method 600 presented below are intended to be illustrative. Method 600 may be accomplished with one or more additional operations not described, and/or without one or more of the operations discussed. Additionally, the order in which the operations of method 600 are illustrated in FIG. 6 and described below is not intended to be limiting.

Method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, obtain machine-readable instructions that, when executed, cause a target computing platform to implement the application. The machine-readable instructions may include instruction modules correspond to features of the application. Operation 602 may be performed by machine readable instructions component the same as or similar to machine-readable instructions component 108 (shown in FIG. 1 and described herein).

At an operation 604, obtain implementation information characterizing implementation of the application by the target computing platform. Operation 604 may be performed by a potential modification component the same as or similar to potential modification component 114 (shown in FIG. 1 and described herein).

At an operation 606, rules are created that define features of the application. The creation of the rules may be based on analysis of the machine-readable instructions, instruction modules, and/or the implementation information. Operation 606 may be performed by a rule generation component the same as or similar to rule generation component 116 (shown in FIG. 1 and described herein).

At an operation 608, an implementation modification may be obtained to effectuate in run-time implementation. Operation 608 may be performed by a modification selection component the same as or similar to modification selection component 120 (shown in FIG. 1 and described herein).

At an operation 610, the machine-readable instructions may be modified to effectuate the implementation modification. The modification of the machine-readable instructions may effectuate a modification of a feature of the application, an addition of a feature to the application, a removal of a feature from the application, and/or a combination of modifications. The modification of the machine-readable instructions may be determined based on the rules created in operation 610. Operation 610 may be performed by a modified application generation component the same as or similar to modified application generation component 122 (shown in FIG. 1 and described herein).

At an operation 612, the modified machine-readable instructions may be distributed to one or more target computing platforms to effectuate implementation by the target computing platforms of the application with the implementation modification. Operation 612 may be performed by a distribution component 124 the same as or similar to distribution component 124 (shown in FIG. 1 and described herein).

Although the system(s) and/or method(s) of this disclosure have been described in detail for the purpose of illustration based on what is currently considered to be the most practical and preferred operations, it is to be understood that such detail is solely for that purpose and that the disclosure is not limited to the disclosed operations, but, on the contrary, is intended to cover modifications and equivalent arrangements that are within the spirit and scope of the appended claims. For example, it is to be understood that the present disclosure contemplates that, to the extent possible, one or more features of any operation can be combined with one or more features of any other operation.

What is claimed is:

1. A system to control run-time implementation of an application on a first target computing platform by modification, addition, and/or removal of machine-readable instructions, the system comprising:
   one or more physical computer processors configured by computer readable instructions to:
   obtain first machine-readable instructions from the first target computing platform that, when executed as part of the application, causes the first target computing platform to implement the application and provide a first set of features of the application;
   obtain implementation information from the first target computing platform characterizing implementation of the application by the first target computing platform;
   analyze the first machine-readable instructions and the implementation information;
   obtain an implementation modification to effectuate run-time implementation of the application on the first target computing platform;
   determine a revised feature to add to, remove from, or modify in the first set of features of the application on the first target computing platform corresponding to the implementation modification to thereby provide a second set of features different from the first set of features;
   obtain a first mediator that facilitates provisioning of one or more features of the second set of features;
   create rules that programmatically govern the modification of the first machine-readable instructions and the first mediator to, when installed on the first target computing system, provide the second set of features, the creation of the rules being based on the analysis of the machine-readable instructions and the implementation information and an analysis of the implementation modification and the first mediator;
   modify the first machine-readable instructions and the first mediator to effectuate the implementation modification based on the rules, the modification of the first machine-readable instructions and the first mediator effectuating the provision of the second set of features; and
   distribute the modified first machine-readable instructions and the modified first mediator to the first target computing platform to effectuate implementation by the first target computing platform of the application with the implementation modification, such that the application, with the modified first machine readable instructions and the modified first mediator, provides the second set of features.

2. The system of claim 1, wherein the revised feature is operationally compatible with the run-time implementation of the application.

3. The system of claim 1, wherein the first machine-readable instructions comprise instruction modules corresponding to one or more features of the first set of features, and the rules govern modifications to one or more of the instruction modules to effectuate the implementation modification.

4. The system of claim 1, wherein the first machine-readable instructions comprise instruction modules corresponding to one or more features of the first set of features, and the one or more processors are further configured by the computer readable instructions to create an instruction store of the instruction modules, the creation of the instruction store including identification of the instruction modules based on recognition of patterns of method calls and/or commands in the first machine-readable instructions.

5. The system of claim 4, wherein the instruction store is an instruction library.

6. The system of claim 5, wherein the rules are held within a rules library, the rules library further including a set of potential modifications to the one or more features of the first set of features of the application made possible through the rules library and the instruction library.

7. The system of claim 1, wherein the implementation information includes documentation characterizing the application, expression of the application at runtime, and/or functionality of the application.

8. The system of claim 7, wherein the implementation information comprises monetization features of the application including payment features of the application, advertising displays, and/or cross-promotion within the application.

9. The system of claim 7, wherein the implementation information includes analysis of end-user behavior including communications of end-users with one another and/or the features of the application.

10. The system of claim 7, wherein the implementation information includes display of services within the application comprising display of internet search features, third-party authentication solutions, and/or features related to user login including social networking features.

11. The system of claim 7, wherein the implementation information includes coding implementations including application standards of life-cycle management, coding implementation at runtime, and/or coded management of the application.

12. The system of claim 1, wherein the first machine-readable instructions comprise instruction modules corresponding to one or more features of the first set of features, and the one or more processors are further configured by the computer readable instructions such that the implementation modification includes a wrapping engine that stores a first replacement instruction module linked to first instruction module of the instruction modules.

13. The system of claim 12, wherein the first mediator controls and/or automates the modification of the first machine-readable instructions.

14. The system of claim 13, wherein the modification of the first machine-readable instructions comprises automatically implementing the implementation modification based on the rules.

15. The system of claim 1, wherein the creation of the rules that programmatically govern the modification of the first machine-readable instructions and the first mediator comprises creating feature rules that define one or more features of the first or second set of features of the application.

16. The system of claim 1, wherein the first machine-readable instructions comprise instruction modules corresponding to one or more features of the first set of features, and obtaining implementation information from the first target computing platform includes identifying a correlation between the instruction modules and the one or more features of the first set of features.

17. The system of claim 1, wherein the revised feature to add to, remove from, or modify in the first set of features of the application on the first target computing platform comprises a set of revised features.

18. A method of modifying an implementation of an application on a first target computing platform by modification, addition, and/or removal of machine-readable instructions, the method being implemented in a computer system including one or more physical processors and storage media storing machine-readable instructions, the method comprising:

obtaining first machine-readable instructions from the first target computing platform that, when executed as part of the application, causes the first target computing platform to implement the application, and provide a first set of features of the application;

obtaining implementation information from the first target computing platform characterizing implementation of the application by the first target computing platform;

analyzing the first machine-readable instructions and the implementation information;

obtaining an implementation modification to effectuate run-time implementation of the application on the first target computing platform;

determining a revised feature to add to, remove from, or modify in the first set of features of the application on the first target computing platform corresponding to the implementation modification to thereby provide a second set of features different from the first set of features;

obtaining a first mediator that facilitates provisioning of one or more features of the second set of features;

creating rules that programmatically govern the modification of the first machine-readable instructions and the first mediator to, when installed on the first target computing system, provide the second set of features, the creation of the rules being based on the analysis of the machine-readable instructions and the implementation information, and an analysis of the implementation modification and the first mediator;

modifying the first machine-readable instructions and the first mediator to effectuate the implementation modification based on the rules, the modification of the first machine-readable instructions and the first mediator effectuating the provision of the second set of features; and distributing the modified first machine-readable instructions and the modified first mediator to the first target computing platform to effectuate implementation by the first target computing platform of the application with the implementation modification, such that the application, with the modified first machine readable instructions and the modified first mediator, provides the second set of features.

19. The method of claim 18, wherein, the revised feature is operationally compatible with the run-time implementation of the application.

20. The method of claim 18, wherein the first machine-readable instructions comprise instruction modules corresponding to one or more features of the first set of features, and the rules govern modifications to one or more of the instruction modules to effectuate the implementation modification.

21. The method of claim 18, the first machine-readable instructions comprise instruction modules corresponding to one or more features of the first set of features, and further comprising creating an instruction store of the instruction modules, the creation of the instruction store including identification of the instruction modules based on recognition of patterns of method calls and/or commands in the first machine-readable instructions.

22. The method of claim 21, wherein the instruction store is an instruction library.

23. The method of claim 22, wherein the rules are held within a rules library, the rules library further including a set of potential modifications to the one or more features of the first set of features of the application made possible through the rules library and the instruction library.

24. The method of claim 18, wherein the implementation information includes documentation characterizing the application, expression of the application at runtime, and/or functionality of the application.

25. The method of claim 24, wherein the implementation information comprises monetization features of the application including payment features of the application, advertising displays, and/or cross-promotion within the application.

26. The method of claim 24, wherein the implementation information includes analysis of end-user behavior including communications of end-users with one another and/or the features of the application.

27. The method of claim 24, wherein the implementation information includes display of services within the application including display of internet search features, third-party authentication solutions, and/or features related to user login including social networking features.

28. The method of claim 24, wherein the implementation information includes coding implementations including application standards of life-cycle management, coding implementation at runtime, and/or coded management of the application.

29. The method of claim 18, wherein the first machine-readable instructions comprise instruction modules corresponding to one or more features of the first set of features, and the one or more processors are further configured by the computer readable instructions such that the implementation modification includes a wrapping engine that stores a first replacement instruction module linked to a first instruction module of the instruction modules.

30. The method of claim 29, wherein the first mediator controls and/or automates the modification of the first machine-readable instructions.

31. The method of claim 30, wherein modifying the first machine-readable instructions comprises automatically implementing the implementation modification based on the rules.

32. The method of claim 18, wherein the creation of the rules that programmatically govern the modification of the first machine-readable instructions and the first mediator comprises creating feature rules that define one or more features of the first or second set of features of the application.

33. The method of claim 18, wherein the first machine-readable instructions comprise instruction modules corresponding to one or more features of the first set of features, and obtaining implementation information from the first target computing platform includes identifying a correlation between the instruction modules and the one or more features of the first set of features.

34. The method of claim 18, wherein the revised feature to add to, remove from, or modify in the first set of features of the application on the first target computing platform comprises a set of revised features.

35. A system to control run-time implementation of an application on a first target computing platform by modification, addition, and/or removal of machine-readable instructions; the system comprising:
one or more physical computer processors configured by computer readable instructions to:
obtain first machine-readable instructions from the first target computing platform that, when executed as part of the application, causes the first target computing platform to implement the application, and provide a first set of features of the application, the first machine-readable instructions comprising instruction modules corresponding to one or more features of the first set of features;
select a modifiable feature from among the first set of features of the application;
analyze the first machine-readable instructions and the instruction modules;
identify a specific instruction module from among the instruction modules corresponding to the modifiable feature of the application based on the analysis of the machine-readable instructions and the instruction modules;
obtain an implementation modification to modify the modifiable feature in the application on the first target computing platform;
obtain a first mediator that facilitates provisioning of the modifiable feature;
modify the specific instruction module of the first machine-readable instructions and the first mediator to effectuate the implementation modification, the modification of the specific instruction module effectuating the provision of the modifiable feature in the application; and
cause the modified machine-readable instructions and the modified first mediator to be distributed to the first target computing platform to enable the first target computing platform to implement the application with the implementation modification.

36. A system to control run-time implementation of an application on a first target computing platform by modification, addition, and/or removal of machine-readable instructions; the system comprising:
one or more physical computer processors configured by computer readable instructions to:
obtain first machine-readable instructions from the first target computing platform that, when executed as part of the application, causes the first target computing platform to implement the application, and provide a first set of features of the application;
obtain implementation information from the first target computing platform characterizing implementation of the application by the first target computing platform;
analyze the first machine-readable instructions, and the implementation information;
obtain an implementation modification to effectuate run-time implementation of the application on the first target computing platform;
determine a revised feature to add to, remove from, or modify in the first set of features of the application on the first target computing platform corresponding to the implementation modification to thereby provide a second set of features different from the first set of features;
obtain a first mediator that facilitates provisioning of one or more features of the second set of features;
modify the first machine-readable instructions and the first mediator to effectuate the implementation modification, the modification of the first machine-readable instructions and the first mediator effectuating the provision of the second set of features, wherein the second set of features are operationally compatible with the run-time implementation of the application and able to interact and exchange information with the features of the application; and
cause the modified first machine-readable instructions and the modified first mediator to be distributed to the first target computing platform to enable the first target computing platform to implement the application with the implementation modification.

37. The system of claim 36, wherein the revised feature to add to, remove from, or modify in the first set of features of the application on the first target computing platform comprises a set of revised features.

38. A system to control run-time implementation of an application on first and second target computing platforms by modification, addition, and/or removal of machine-readable instructions, the system comprising:
one or more physical computer processors configured by computer readable instructions to:
obtain first machine-readable instructions from the first target computing platforms that, when executed as part of the application on the first target computing platform, causes the first target computing platforms to implement the application and provide a first set of features of the application;
obtain second machine-readable instructions from the second target computing platform that, when executed as part of the application on the second target computing platform, causes the second target computing platform to implement the application and provide the first set of features of the application;
obtain first and second implementation information from the first and second target computing platforms, respectively, characterizing implementation of the application by the first and second target computing platforms, respectively;
analyze the first and second machine-readable instructions and the first and second implementation information;
obtain an implementation modification to effectuate run-time implementation of the application on the first and second target computing platforms;
determine a revised feature to add to, remove from, or modify in the first set of features of the application on the first and second target computing platforms corresponding to the implementation modification to thereby provide a second set of features different from the first set of features;
obtain a first mediator that facilitates provisioning of one or more features of the second set of features on the first target computing platform;
obtain a second mediator that facilitates provisioning of one or more features of the second set of features on the second target computing platform;
create first rules that programmatically govern the modification of the first machine-readable instructions and the first mediator to, when installed on the first target computing system, provide the second set of features on the first target computing platforms, the creation of the first rules being based on the analysis of the first machine-readable instructions and the first implementation information and an analysis of the implementation modification and the first mediator;
create second rules that programmatically govern the modification of the second machine-readable instructions and the second mediator to, when installed on the first target computing system, provide the second set of features on the second target computing platform, the creation of the second rules being based on the analysis of the second machine-readable instructions and the second implementation information and an analysis of the implementation modification and the second mediator, wherein the first and second rules are different;
modify the first and second machine-readable instructions and the first and second mediators to effectuate the implementation modifications based on the first and second rules, respectively, the modification of the first and second machine-readable instructions and the first and second mediators effectuating the provision of the second set of features; and
distribute the modified first and second machine-readable instructions and the first and second mediators to the first and second target computing platforms, respectively, to effectuate implementation by the first and second target computing platforms of the application with the implementation modifications, such that the application, with the modified first machine readable instructions and the modified first mediator, provides the second set of features on the first target computing platform and such that the application, with the modified second machine readable instructions and the modified second mediator, provides the second set of features on the second target computing platform,
wherein the first and second target computing platforms are different, and the first and second mediators are different.

39. The system of claim 38, wherein the revised feature to add to, remove from, or modify in the first set of features of the application on the first and second target computing platform comprises a set of revised features.

40. A method of modifying implementations of an application by modification, addition, and/or removal of machine-readable instructions on first and second target computing platforms, the method being implemented in a computer system including one or more physical processors and storage media storing machine-readable instructions, the method comprising:
obtaining first machine-readable instructions from the first target computing platforms that, when executed as part of the application on the first target computing platform, causes the first target computing platform to implement the application and provide a first set of features of the application;
obtaining second machine-readable instructions from the second target computing platform that, when executed as part of the application on the second target computing platform, causes the second target computing platform to implement the application and provide the first set of features of the application;
obtaining first and second implementation information from the first and second target computing platforms, respectively, characterizing implementation of the application by the first and second target computing platforms, respectively;
analyzing the first and second machine-readable instructions and the first and second implementation information;
obtaining an implementation modification to effectuate run-time implementation of the application on the first and second target computing platform;
determining a revised feature to add to, remove from, or modify in the first set of features of the application on the first and second target computing platforms corresponding to the implementation modification to thereby provide a second set of features different from the first set of features;
obtaining a first mediator that facilitates provisioning of one or more features of the second set of features on the first target computing platform;
obtaining a second mediator that facilitates provisioning of one or more features of the second set of features on the second target computing platform;

creating first rules that programmatically govern the modification of the first machine-readable instructions and the first mediator to, when installed on the first target computing system, provide the second set of features on the first target computing platforms, the creation of the first rules being based on the analysis of the first machine-readable instructions and the first implementation information and an analysis of the implementation modification and the first mediator;

creating second rules that programmatically govern the modification of the second machine-readable instructions and the second mediator to, when installed on the first target computing system, provide the second set of features on the second target computing platform, the creation of the second rules being based on the analysis of the second machine-readable instructions and the second implementation information and an analysis of the implementation modification and the second mediator, wherein the first and second rules are different;

modifying the first and second machine-readable instructions and the first and second mediators to effectuate the implementation modifications based on the first and second rules, respectively, the modification of the first and second machine-readable instructions and the first and second mediators effectuating the provision of the second set of features; and distributing the modified first and second machine-readable instructions and the first and second mediators to the first and second target computing platforms, respectively, to effectuate implementation by the first and second target computing platforms of the application with the implementation modifications, such that the application, with the modified first machine readable instructions and the modified first mediator, provides the second set of features on the first target computing platform and such that the application, with the modified second machine readable instructions and the modified second mediator, provides the second set of features on the second target computing platform, wherein the first and second target computing platforms are different, and the first and second mediators are different.

41. The method of claim 40, wherein the revised feature to add to, remove from, or modify in the first set of features of the application on the first and second target computing platform comprises a set of revised features.

* * * * *